United States Patent [19]

Hankinson

[11] Patent Number: 5,786,868
[45] Date of Patent: Jul. 28, 1998

[54] AUTOMATIC STEP GENERATOR FOR SELF-CORRECTION OF SAMPLING

[75] Inventor: Robert J. Hankinson, Carrollton, Tex.

[73] Assignee: Cirrus Logic, Inc., Fremont, Calif.

[21] Appl. No.: 578,301

[22] Filed: Dec. 22, 1995

[51] Int. Cl.⁶ .................................................. H04N 5/12
[52] U.S. Cl. .................................... 348/536; 348/500
[58] Field of Search ........................... 348/536, 500,
348/537, 540, 541, 542, 543, 544, 545,
546, 547, 548, 549, 505, 506, 507, 508,
497, 498, 499; 358/148, 158; 331/175,
158, 160, 73, 74; 375/374, 375, 376; H04N 5/04,
5/12

[56] References Cited

U.S. PATENT DOCUMENTS

| | | | |
|---|---|---|---|
| 4,463,371 | 7/1984 | Lewis, Jr. | 358/13 |
| 4,612,568 | 9/1986 | den Hollander et al. | 358/19 |
| 4,635,097 | 1/1987 | Tatami | 358/13 |
| 4,694,326 | 9/1987 | Demmer | 358/19 |
| 4,736,238 | 4/1988 | Moriyama et al. | 358/19 |
| 4,797,730 | 1/1989 | Smith | 358/19 |
| 4,905,085 | 2/1990 | Faulhaber | 358/148 |
| 4,941,035 | 7/1990 | Judge | 358/10 |
| 4,970,581 | 11/1990 | O'Gwynn | 358/17 |
| 4,975,767 | 12/1990 | Sorenson | 358/19 |
| 5,043,799 | 8/1991 | Kohiyama et al. | 358/19 |
| 5,243,412 | 9/1993 | Goukura et al. | 358/19 |
| 5,325,093 | 6/1994 | Takamori | 341/155 |

Primary Examiner—Chris Grant
Attorney, Agent, or Firm—David H. Tannenbaum; Steven A. Shaw

[57] ABSTRACT

An automatic step generator that monitors and corrects the sampling rate in a video signal. The invention isolates a sampling window in the prevailing sampling rate, the window advantageously being 144 lines for NTSC, or 231 lines for PAL, or some other preselected window wherein the sample count therein at an ideal sampling rate approximates an integer power of 2. The invention then calculates the numeric difference between that ideal sample count in the window and the preselected integer power of 2. The actual sample count in the window is then determined, and is adjusted by the numeric difference between the ideal count and the integer power of 2. Variations in this adjusted actual sample count and the integer power of 2 will thus represent variations between the actual sampling rate and the ideal sampling rate. A step value to correct the actual sampling rate to achieve the ideal rate may then be derived by dividing the adjusted actual sample count by the integer power of 2. In binary, this division is simply a shift right in bit significance. The step value may thus be derived directly and immediately from the adjusted sample count.

28 Claims, 2 Drawing Sheets

AUTOMATIC STEP GENERATOR FOR SELF-CORRECTION OF SAMPLING

TECHNICAL FIELD OF THE INVENTION

This invention relates to control circuits for use with crystals, and more specifically to such circuits that, in the decoding of television signals, self-calibrate when sampling a video signal.

BACKGROUND OF THE INVENTION

It is well known that a minimal-cost, digital implementation of a television signal decoder will sample the incoming video transmission at a rate of four times the color subcarrier. This decoding includes demodulating the color signal. Fidelity in hue and tint in reception of the color is very sensitive to the accuracy of the sampling rate.

It is also well known that the crystals used to generate the sampling rate can be less than perfect. Variations in the clock rate of a crystal tend lead directly to variations in the sampling rates.

Clearly, therefore, improved precision in color transmission could be achieved by using more accurate crystals. Such accurate crystals tend to be very expensive, however, and therefore have diminished commercial application in the manufacture of general purpose televisions.

A need therefore exists for a device that enables sampling by crystals with slight variation in clock rate to be self-correcting. In this way, slightly imperfect crystals may be used to demodulate color signals with improved precision.

It will be further understood that in theory, corrections to sampling rate could possibly be made with external software. The context of video sampling makes such an approach generally impractical, however. First, adjustments will need to be made very quickly in order to support continuous high color fidelity. The processing cycles of such external software may be incompatible with the desired rate of adjustment. Second, field boundaries and frame synchronization information in the video transmission stream may severely hamper and complicate the mechanisms by which external software may monitor and recalibrate actual sampling rate.

Accordingly, it would be highly advantageous to have a device that selfcorrects sampling without relying exclusively on external software. It would be also highly advantageous for the device to recognize the need for correction and then enable such correction within one video frame or field.

It is further well known in the art that television signals are broadcast on one of several standards, including NTSC, PAL and SECAM. Most worldwide broadcast networks use either the NTSC or PAL standard. It would therefore be advantageous for a self-correcting device as described above to work regardless of the transmission standard used, and particularly in both NTSC and PAL.

SUMMARY OF THE INVENTION

As noted above, it is an object of this invention to provide a device that self-calibrates the sampling rate in demodulation of a color signal from a video transmission, by correcting for slight variations in the clock rate of crystals used to generate the sampling rate. The invention does this by taking advantage of the fact that the horizontal synchronization rate ("sync rate") of the incoming signal is precise and dependable. The invention may therefore use this sync rate as a reference against which to correct the prevailing sampling rate to a predefined ideal rate.

It should further be noted that the present invention applies to any predetermined ideal sampling rate against which a measured sampling rate is desired to be compared and corrected. The preferred embodiment herein discloses exemplary use of an ideal sampling rate of 4 times the frequency of the color subcarrier. Use of this rate generally facilitates an easy and inexpensive implementation of color decoding. The present invention is in no way limited to such predetermined ideal sampling rates, however.

In adopting an exemplary predetermined sampling rate of 4 times the subcarrier, the preferred embodiment will therefore operate according to a predetermined ideal sampling rate for the NTSC transmission standard of 910 samples per line, and for the PAL transmission standard of 1135.0064 samples per line. It will be understood by those in this art that these sampling rates will result at 4 times the frequency subcarrier for those transmission standards.

In general, the present invention accomplishes sampling rate correction by monitoring the actual sampling rate and comparing it to a theoretical ideal sampling rate, thus deriving a step factor by which the actual sampling rate must be adjusted to achieve the theoretical ideal rate. In the exemplary application as described above, the invention takes advantage of the fact that at 910 samples per line, the theoretical ideal sample count in a 144-line window in an NTSC frame is a number almost exactly equal to $2^{17}$. Further, at 1135.0064 samples per line, the theoretical ideal count in a 231-line window in a PAL frame is a number almost exactly equal to $2^{18}$. Binary calculation of the step value in these windows thus becomes dramatically facilitated, permitting rapid and continuous correction of the sampling rate.

A further feature of this invention is therefore evident in that it may be used in the decoding of signals broadcast on any television standard, specifically including NTSC and PAL.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 is a representation of an 18-bit register, such as may be found in step latch 206 on FIG. 2, containing a color sample count of exactly $2^{17}$.

FIG. 4 is the 18-bit register of FIG. 3 containing a sample count of $2^{17}+4$.

FIG. 4A is a binary representation of the step value derived when the sample count of $2^{17}+4$ in FIG. 4 is divided by $2^{17}$.

FIG. 5 is the 18-bit register of FIG. 3 containing a sample count of $2^{17}-1$.

FIG. 5A is a binary representation of the step value derived when the sample count of $2^{17}-1$ in FIG. 5 is divided by $2^{17}$.

DESCRIPTION OF THE PREFERRED EMBODIMENTS

Figure 1:
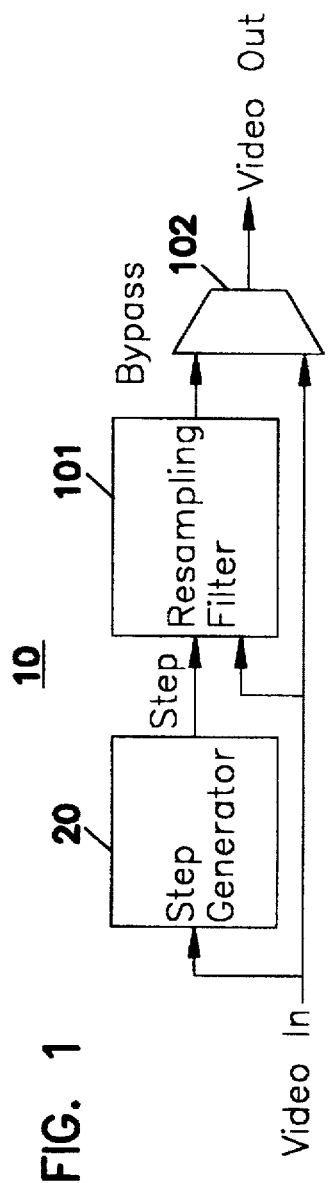
FIG. 1 illustrates a circuit 10 in which a step generator 20 and a resampling filter 101 may be introduced into a video transmission stream to make corrections to the color sampling rate in accordance with the present invention.

As described above, although the present invention may make corrections to achieve any predetermined ideal sampling rate, a preferred embodiment herein adopts exemplary use of an ideal sampling rate in NTSC of 910 samples per line. The present invention could select any number of lines over which to monitor sample rate, but advantageously, a value of 144 lines is selected as a sampling window for reasons set forth below. It is important to note that 144 lines, while allowing sufficient monitoring to detect small variations in sampling rate, is still substantially less than the total number of lines in an NTSC video frame. Having selected a window with 144 lines, it therefore follows that the theoretical number of total samples ideal for the frame is 144×910=131,040.

The invention next takes advantage of the fact that as a mathematical constant, $2^{17}$ equals 131,072. This is only 32 more than the ideal total number of samples in the window.

It therefore follows that when a video sample counter is combined with an error counter, wherein 32 additional sample counts are spread evenly over the 144-line window, the total samples counted at ideal conditions will be $2^{17}$ or 131,072. Variations from this figure detected by the sample counter will then represent fluctuations in the actual video sampling rate.

The actual sample count including variations, may then be divided by $2^{17}$ to yield a factor, or a step value, by which the actual sampling rate may be adjusted to bring it back to the ideal rate.

It will be further understood that it is particularly advantageous to use the number $2^{17}$ as a divisor to derive the step value. Since the foregoing counting and computations will be undertaken by digital processors in a binary format, the division of any actual sample count by $2^{17}$ may be performed simply by making a 17-place shift to the right in bit significance. The step value by which the sampling rate needs to be modified may thus be derived directly from the actual sample count.

It will be readily appreciated that the foregoing methodology is not limited to NTSC. In the case of PAL, as described above, a preferred embodiment adopts exemplary use of an ideal sampling rate of 1135.0064 samples per line. Although a sampling window of any number of lines may be selected, a value of 231 lines is particularly advantageous. It again is a window of sufficient size to detect small variations in sampling rate, but is still substantially less than the total number of lines in the PAL video field. Multiplying samples by lines, a 231-line window give an ideal sample count of 262,186.4784 samples.

It is now of mathematical significance that $2^{18}$ equals 262,144. This means that by using the error count insertion techniques described above, 41 artificial counts may be added to the PAL sampling window, spread evenly over the 231 lines, to give an ideal sample count of $2^{18}$. Again, as described above, the actual sample count in PAL signal may be monitored, adjusted numerically by 41, and then divided by $2^{18}$ by simply making an 18-place shift right in bit significance. The resulting quotient becomes directly the step value by which the actual sampling rate needs to be adjusted to become an ideal sampling rate.

It will be understood by those of skill in this art that the foregoing methodology is not limited to NTSC and PAL television transmission standards. Clearly, this method of sampling rate self-correction applies whenever an ideal total number of samples counted in a predefined window can be approximated to an integer power of 2.

A preferred embodiment applying the foregoing invention is first illustrated in FIG. 1. Circuit 10 receives a video input signal and generates a video output signal. The video input signal in may either go direct to output, or may first feed step generator 20 and resampling filter 101. Step generator 20 feeds calculated step values to resampling filter 101 to adjust the video input signal in accordance with the step value. The step values are calculated in accordance with the above-described methodology. Output multiplexer 102, advantageously controlled by software, allows the video input signal either to feed through step generator 20 and resampling filter 101, or to bypass them. Step generator 20 may also receive instructions to generate steps from an external source, such as external software or a "go-pulse" generator.

Resampling filter 101 may be any (sin x)/x filter, but advantageously its step input must support a very high resolution in reading the fractional portion of a step value. In other words, the output video stream of resampling filter 101 must be capable of being adjusted with precision according to small incremental step values. Those skilled in the art will understand that although not a limitation hereof, the exemplary use of such a filter in the preferred embodiment will allow high resolution resampling within a narrow numeric bandwidth of step values.

Figure 2:
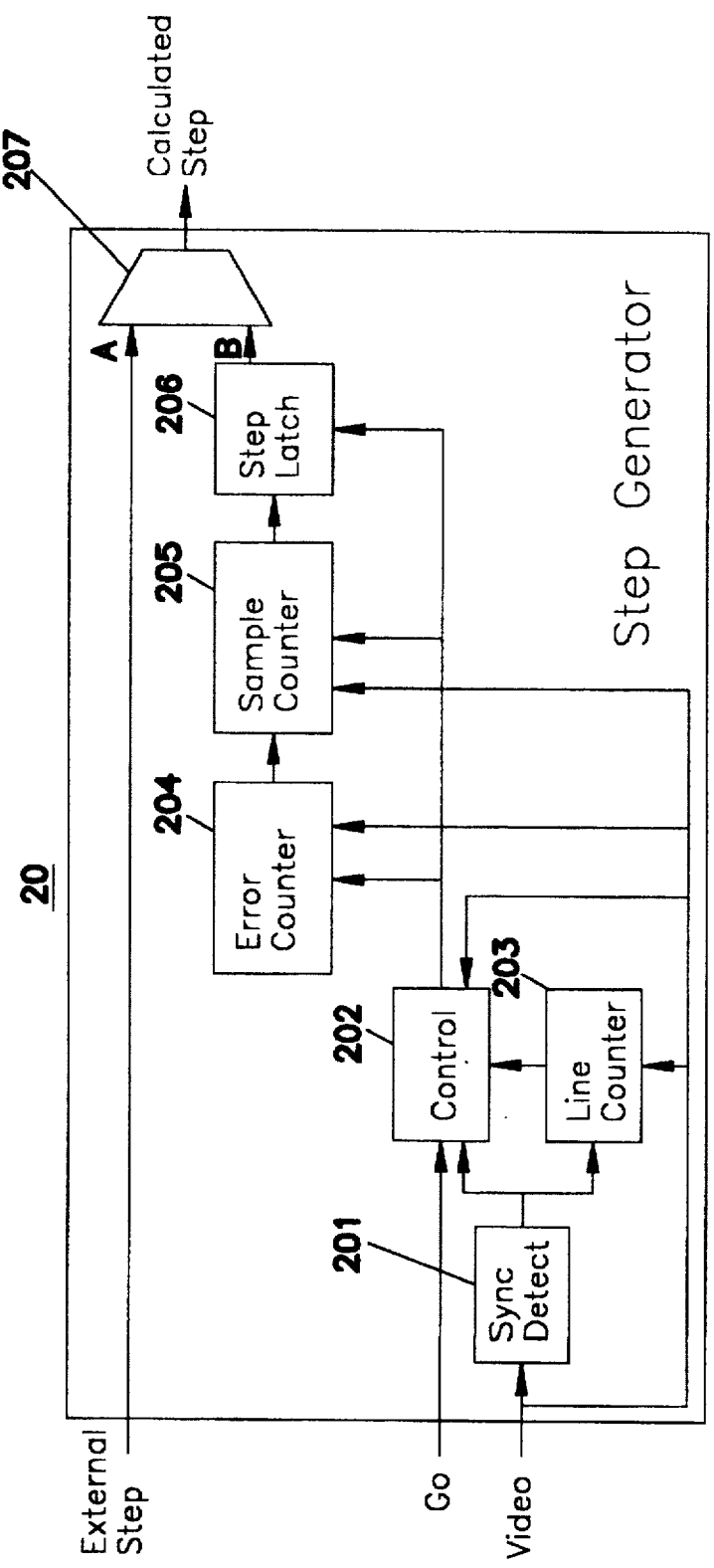
FIG. 2 illustrates step generator 20 in more detail.

Turning now to FIG. 2, the details of step generator 20 will be discussed. Step generator 20's function is to generate the step whose step value specifies to resampling filter 101 the amount of adjustment to make to the sampling rate of the video input signal. As noted above and also illustrated on FIG. 2, step generator 20 can also accept an externally software-generated step value derived by a means extrinsic to the present invention, or it may accept a "go-pulse". With further reference to FIG. 2, multiplexer 207, advantageously under software control, may either select the externally software-generated step, or a calculated step fed from step latch 206. The output of multiplexer 207 is fed to resampling filter 101, as illustrated in FIG. 1.

In normal use, a video input signal will feed into sync detect block 201 with which step generator 20 first detects frame line boundaries in preparation for line counting, sample counting and step value calculation. Sync detect block 201 feeds line counter 203, whose function is to increment and count lines according to the sample window selected. As noted above, in the case of NTSC this window will advantageously be 144 lines, while in the case of PAL, this window will advantageously be 231 lines.

Control block 202 contains the logic governing the operation of step generator 20. As illustrated on FIG. 2, control block 202 may oversee operation of sync detect block 201 and line counter 203, or may prioritize operation of step generator 20 with reference to an array of sample windows selectable according to whether NTSC, PAL or some other transmission standard is being sampled.

Control block 202 also governs the operation of error counter 204, sample counter 205, and step latch 206. In accordance with the methodology described above, control block 202 will inform error counter 204 to insert artificial sample counts over a sampling window to make the total ideal sample count for that period equal to $2^{17}$ if NTSC, or $2^{18}$ if PAL, or $2^n$ for some other sampling window or some other predetermined ideal sampling rate.

Sample counter 205 will then count actual samples monitored in the video signal input, as supplemented by error counter 204. Step latch 206 will then take this sample count and divide by the appropriate power of 2 to yield a calculated step value with which to adjust the sampling rate. As described above, step latch 206 will advantageously accomplish this division in binary simply by shifting right in bit significance an appropriate number of places.

It will be understood in the preferred embodiment that by making step latch 206 capable of storing 18 bits of fraction in all cases, step generator 20 may produce a generic output in which resampling filter 101 need not know whether it is operating in NTSC or PAL. As noted above, the preferred sampling windows for NTSC uses $2^{17}$ as its ideal total sample count and so when processing NTSC signals, the 18-bit register in step latch 206 will always have a zero in the right most bit. In contrast, this right most bit will be used in PAL, since the ideal total sample count in the preferred sampling window for PAL is $2^{18}$.

Turning now to FIG. 3, let it be assumed that the total sample count for a given sampling window in NTSC was exactly $2^{17}$. This would mean that the sampling rate would require no adjustment. The 18-bit register in step latch 206 would look as shown on FIG. 3. Dividing in binary by $2^{17}$, the binary number represented in FIG. 3 is shifted right 17 places in bit significance. Step latch 206 will output "1" to the left of the binary point and nothing at all to the right. Resampling filter 101 would interpret this as an instruction not to adjust the actual sampling rate.

Turning now to FIG. 4, it is assumed that sample counter 205 monitored a sample rate slightly faster than ideal, and so has sent a sample count of $2^{17}+4$ to step latch 206. The sample count received by step latch 206 in its 18-bit register will therefore be as illustrated on FIG. 4. When step-latch 206 makes its 17-place shift, its output as a calculated step value will be as illustrated on FIG. 4A. Note that the calculated step value shown on FIG. 4A has a "1" to the left of the binary point, and a binary factor to the right. Resampling filter 101 will interpret the "1" to the left of the decimal point as an instruction to slow the sample rate down by a factor represented by the binary fraction to the right of the binary point in FIG. 4A.

Turning now to FIG. 5, it is assumed that sample counter 205 is monitoring a sample rate slighter slower than ideal, and will therefore have sent a sample count to step latch 206 as illustrated in FIG. 5. When step latch 206 makes its 17 place shift right in binary significance, resampling filter 101 will interpret the "0" to the left of the binary point to increase the actual sampling rate by a step value represented by the factor represented by the binary fraction to the right of the binary point.

Although the preferred embodiment of the present invention is directed to correcting measured sampling rates against expected sampling rates chosen with reference to television transmission standards, it will be understood by those skilled in the art that such resampling is generally driven by the clock rate of a crystal. As noted above, inexpensive crystals tend to have imperfections in their clock rates. It will therefore be understood that the present invention has application in any field wherein the clock rate of a crystal may require correction.

It will also be understood by those skilled in the art that the present invention can be implemented as software operating on a computer system having a central processing unit (CPU), memory, and display. As noted above, the actual measuring of the sampling in the predetermined number of lines in the video window is not particularly suitable to software control due to the potentially slow speed of the software. However, once the sampling has been done, the adaptations of the results of the sampling may easily be performed by software.

Although the present invention and its advantages have been described in detail, it should be understood that various changes, substitutions and alterations can be made herein without departing from the spirit and scope of the invention as defined by the appended claims.

I claim:

1. A method of generating a correction factor for variations in an actual sample count in a system in which variations between a measured sampling rate and a desired sampling rate could occur, said method comprising the steps of:

selecting a sampling window in the measured sampling rate, the sampling window theoretically containing an ideal sample count at the desired sampling rate, the sampling window selected so that the ideal sample count approximates a preselected integer power of 2;

calculating a numeric difference between the ideal sample count and the preselected integer power of 2;

monitoring for actual samples experienced in the sampling window;

counting said actual samples to derive the actual sample count;

adjusting the actual sample count with the numeric difference between the ideal sample count and the preselected integer power of 2;

representing said adjusted actual sample count in binary as a binary sample count; and adjusting the binary sample count a number of places equal to the preselected integer so as to yield a binary quotient as said correction factor.

2. The method of claim 1, in which the sampling window is 144 lines of an NTSC video field, and in which the desired sampling rate is 910 samples per line, and in which the preselected integer power of 2 is $2^{17}$.

3. The method of claim 1, in which the sampling window is 231 lines of a PAL video field, and in which the desired sampling rate is 1135.0064 sample per line, and in which the preselected integer power of 2 is $2^{18}$.

4. The method of claim 1, in which the step of adjusting the actual sample count with the numeric difference also includes the step of distributing said numeric difference throughout the sampling window according to a preselected distribution pattern.

5. The method of claim 4, in which the preselected distribution pattern is an even distribution.

6. In a television color decoding system in which variations between a measured color sampling rate and a desired color sampling rate could occur, a step generator for generating steps from an actual color sample count to correct said measured color sampling rate, comprising:

a video input signal;

a sync detector and a line counter, the sync detector and the line counter in combination isolating a preselected sampling window within the video input signal, the preselected sampling window comprising a predetermined number of lines within one video field, the preselected sampling window also comprising an expected color sample count, said expected color sample count preselected with reference to a predetermined television transmission standard;

a control means, the control means knowing the expected color sample count, the control means also assigning an error count value to a numeric difference between the expected color sample count and a preselected integer power of 2;

a sample counter, the sample counter analyzing the video input signal to determine the actual color sample count experienced in the preselected sampling window;

an error counter, the error counter numerically adjusting the actual color sample count by the error count value to yield an adjusted actual color sample count;

a step latch, the step latch generating a corrective step whose value may be applied to the measured color sampling rate to achieve the desired color sampling rate, said value computed by shifting in binary significance a binary representation of the adjusted color sample count a number of binary places equal to the preselected integer.

7. The step generator of claim 6, in which the predetermined television transmission standard is NTSC.

8. The step generator of claim 7, in which the expected color sample count is 131,040 and the preselected integer power of 2 is $2^{17}$.

9. The step generator of claim 6, in which the predetermined television transmission standard is PAL.

10. The step generator of claim 9, in which the expected color sample count is 262,186.4784 and the preselected integer power of 2 is $2^{18}$.

11. The step generator of claim 6, further comprising:

means for receiving a "go pulse"; and means for energizing the step latch to generate the corrective step immediately upon receipt of said "go pulse".

12. The step generator of claim 6 in which the error counter numerically adjusts the actual color sample count according to a preselected distribution pattern.

13. The step generator of claim 12, in which the preselected distribution pattern is an even distribution.

14. In a system in which variations between a measured sampling rate and a desired sampling rate could occur, a step generator for generating steps from an actual sample count to correct said measured sampling rate, comprising:

an input signal;

means for isolating a sampling window in the input signal, the size of the sampling window selected so that a theoretical expected sample count within the sampling window at the desired sampling rate approximates a predetermined integer power of 2;

means for determining a numerical difference between the theoretical expected sample count and the predetermined integer power of 2;

means for counting actual samples actually experienced in the input signal during the sampling window to derive the actual sample count;

means for adjusting said actual sample count by said numerical difference between the theoretical expected sample count and the predetermined integer power of 2; and means for adapting said adjusted actual sample count by the predetermined integer power of 2 to give a binary quotient, said binary quotient applied to the measured sampling rate to correct the measured sampling rate.

15. The step generator of claim 14, in which the theoretical expected sample count is 131,040 and the predetermined integer power of 2 is $2^{17}$.

16. The step generator of claim 14, in which the theoretical expected sample count is 262,186.4784 and the predetermined integer power of 2 is $2^{18}$.

17. The step generator of claim 14, in which the means for adapting includes means for adjusting in binary significance a binary value of the adjusted actual sample count a number of places equal to the predetermined integer.

18. The step generator of claim 14, in which the means for adapting includes means for correcting the measured sampling rate in relation to a binary fraction of said binary quotient.

19. The step generator of claim 14 in which the means for adjusting said actual sample count by said numerical difference also includes means for distributing said numerical difference according to a preselected distribution pattern.

20. The step generator of step 19, in which the preselected distribution pattern is an even distribution.

21. A method for correcting for variations in a clock rate comprising the steps of:

measuring clock ticks to derive an actual clock rate selecting a sampling window containing an expected clock count, the sampling window selected so that the expected clock count approximates a preselected integer power of 2;

calculating a numeric difference between the expected clock count and the preselected integer power of 2;

counting clock ticks experienced in the sampling window at the actual clock rate to derive an actual clock count;

adjusting the actual clock count with the numeric difference between the expected clock count and the preselected integer power of 2.

22. A computer program product having a computer readable medium having computer program logic recorded thereon for deriving a measured sampling rate correction factor, said computer program product in a computer system having a memory, a display unit and a processor, said computer program product comprising:

means for isolating a sampling window in an input signal, the size of the sampling window selected so that a theoretical expected sample count within the sampling window at a desired sampling rate approximates a predetermined integer power of 2;

means for determining a numerical difference between the theoretical expected sample count and the predetermined integer power of 2;

means for counting actual samples actually experienced in the input signal during the sampling window to derive actual sample count;

means for adjusting said actual sample count by said numerical difference between the theoretical expected sample count and the predetermined integer power of 2; and means for adapting said adjusted actual sample count by the predetermined integer power of 2 to give a binary quotient as the measured sampling rate correction factor.

23. The computer program product of claim 22, in which the theoretical expected sample count is 131,040 and the predetermined integer power of 2 is $2^{17}$.

24. The computer program product of claim 22, in which the theoretical expected sample count is 262,186.4784 and the predetermined integer power of 2 is $2^{18}$.

25. The computer program product of claim 22, in which the means for adapting includes means for adjusting in binary significance a binary value of the adjusted actual sample count a number of places equal to the predetermined integer.

26. The computer program product of claim 22 in which the means for adjusting said actual sample count by said numerical difference also includes means for distributing said numerical difference according to a preselected distributed pattern.

27. The computer program product of step 26, in which the preselected distribution pattern is an even distribution.

28. The method of claim 21 further comprising the steps of:

representing said adjusted actual clock count in binary as a binary clock count;

adjusting the binary clock count a number of places equal to the preselected integer so as to yield a binary quotient; and using said binary quotient as a correction factor for the actual clock rate.

* * * * *